Figure 1:
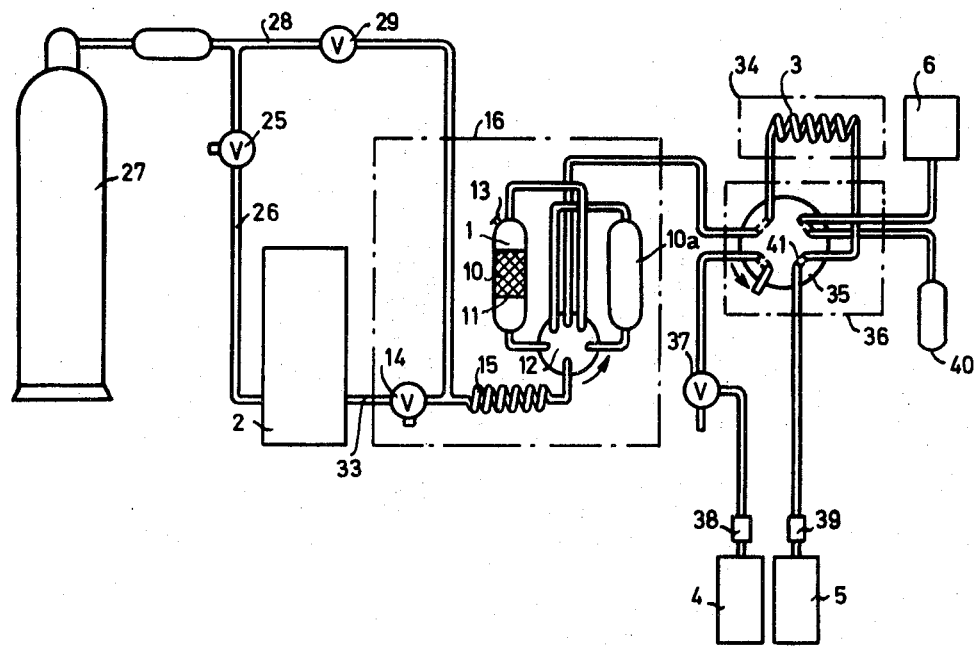

United States Patent

Sjoquist

[15] 3,645,689
[45] Feb. 29, 1972

[54] METHOD AND APPARATUS FOR ANALYZING PROTEINS

[72] Inventor: John A. Sjoquist, Uppsala, Sweden
[73] Assignee: LKB-Produkter AB, Bromma, Sweden
[22] Filed: Apr. 9, 1970
[21] Appl. No.: 26,977

[52] U.S. Cl. .................... 23/230 R, 23/230 M, 23/232 R, 23/232 C, 23/253 R, 23/254 R
[51] Int. Cl. ............. G01n 31/06, G01n 31/08, G01n 33/00
[58] Field of Search ............... 23/230, 232, 253, 254, 23, 23/61.1 C

[56] References Cited

UNITED STATES PATENTS 3,298,786  1/1967   Hinsvark..................................23/230
3,505,021  4/1970   Eveleigh..................................23/230
3,537,821  11/1970  Hrdina....................................23/230

Primary Examiner—Morris O. Wolk
Assistant Examiner—R. E. Serwin
Attorney—Christen & Sabol

[57] ABSTRACT

A method and an apparatus for determining the sequence of the amino acids in a protein. The protein is applied to the surface of a solid support arranged in a reactor. A vaporized coupling agent is supplied to the protein thus forming a protein derivative. The protein derivative is split at the first peptide binding by a supplied vaporized splitting agent and the amino acid derivative split off is transferred to an absorber. By raising the temperature of the absorber the amino acid derivative is then transferred to an analyzer, e.g., a gas chromatograph.

16 Claims, 2 Drawing Figures

METHOD AND APPARATUS FOR ANALYZING PROTEINS

The present invention refers to a method and apparatus for determining the amino acids in a protein. It is known per se to carry out such a determining by making the protein react with a chemical compound, a so-called coupling agent, which is combined with the amino end of the protein molecule. The protein molecule is then split at the first peptine binding. Thus, a remaining part of the protein and an amino acid derivative is formed. The amino acid or the amino acid derivative could then be identified for instance by means of gas chromatography. This procedure is then repeated, i.e., the next amino acid is split from the protein molecule, etc.

It is known per se to carry out such a sequence determining in a solution. This procedure will, however, imply certain drawbacks, which drawbacks among other things are due to the fact that the solubility of the remaining part of the protein increases as the chain length of the protein molecule is decreased. Furthermore, the procedure is rather complicated and lengthy. Another drawback consists therein that unwanted side reactions appear.

The above-mentioned drawbacks are reduced or eliminated by using the present invention according to which the analysis is carried out in gas phase and according to which the analysis is carried out in has phase and according to which those groups in the protein molecule which give rise to said reactions are blocked. The method according to the invention is characterized in, that the protein is applied on a solid support, that a coupling agent in gas phase is supplied to the protein, and that after the splitting the formed amino acid derivative is removed in gas phase. According to a preferred embodiment of the invention, the protein applied on the support is treated with a blocking agent by means of which reactive groups in the protein molecule are blocked and thus the risk of obtaining unwanted side reactions of the protein and the coupling agent is eliminated.

By using the method according to the invention a high degree of specific splitting is obtained, i.e., only one amino acid is split from the protein in each operation. Furthermore, very few unwanted side reactions appear. According to the invention it is furthermore possible to use a very small quantity of protein, i.e., 1 nanomol or less is required. As the analysis is carried out in gas phase a fast determining is obtained and furthermore an automatic control of the operation could easily be obtained.

The solid support of the protein is preferably a material that has a certain adsorbing effect on protein molecules but which has a very low adsorbing effect on the split amino acid derivatives which have a small molecular mass. Glass has been found to have these properties. The glass is preferably etched, for instance with fluoric acid so as to obtain a large surface. The glass can be used in the form of small beads, preferably having a diameter of less than 0.1 mm. so as to make an analysis in a fluidized bed possible. Alternatively the glass could be in the form of a capillary, preferably having an inner diameter of 0.3–1 mm. If the support is a powder the protein is preferably supplied as a solvent. The amount of solvent should be small in comparison with the quantity of powder so that the powder can adsorb the solvent without losing its character of a dry powder. If the carrier has the form of a capillary, the protein solvent is pressed through the capillary tube and part of the protein will be adsorbed on the wall of the capillary. If the support consists of powder the beads should be massive without micropores as such pores would too much adsorb the compounds having small mass numbers.

The coupling agent and other used reagents are supplied to the protein applied on the support by means of a carrier gas which should be free from oxygen and other impurities and for instance consist of nitrogen or a noble gas. The mixing of reagent and carrier has preferably takes place in such a way that the carrier gas is introduced into a container which contains the reagent. By regulating, e.g., the temperature of the container and the flow velocity of the carrier gas the partial pressure of the reagent in the carrier gas can be regulated.

As a coupling agent an isothiocyanate is preferably used as this compound has a sufficient volatility to be supplied to the protein in gas phase. Suitable compounds are, e.g., tert. butylisothiocyanate, allylisothiocyanate, methylisothiocyanate or trimethylsilylisothiocyanate. The coupling agent should be mixed with a volatilizable buffer, e.g., trimethylamine, triethylamine or pyridine and water. The buffer is preferably mixed with a carrier gas as described above, the buffer then being supplied to the carrier gas stream which contains the coupling agent. In order to make sure that an effective mixing is obtained the gas mixture is preferably supplied through a relatively narrow tube in which a turbulent flow could be obtained.

The reaction is preferably carried out in several steps, the first step implying a reaction between the coupling agent and the amino end of the protein molecule and the second step implying a splitting of the protein derivative by means of a supplied unhydric acid, e.g., formic acid, acetic acid, trifluoracetic acid, hydrogen chloride or compounds of these acids. When using a methylisothiocyanate as a coupling agent the following reaction will take place:

The obtained protein derivative will then be split as will be described below, the splitting implying a forming of a protein rest and a cyclic thiazolinone derivative of an amino acid:

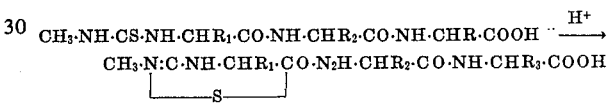

The obtained thiazolinone is unstable but is transformed into the corresponding isomeric, stable methylthiohydantoine derivative by the supplied acid in accordance with the formula:

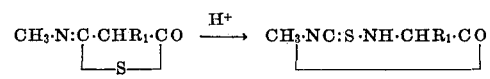

Other coupling agents that can be used are alkalicyanates and -isothiocyanates, e.g.:

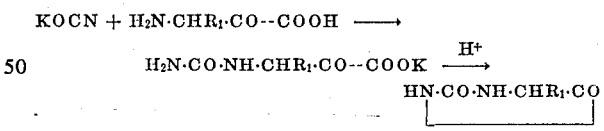

Dithiouretanes can also be used as coupling agents, e.g., ethyl-N-bensoyldithiocarbamate as described by the following formula:

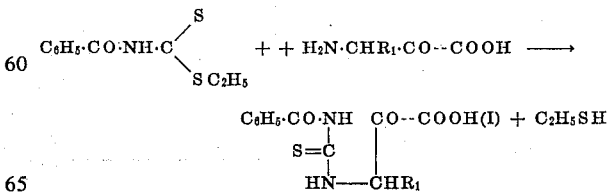

The compound (I) is split at the first peptide binding and is transformed into a stable thiohydantoine derivative according to the following formula:

Further coupling agents that can be used are phosgene or thiophosgene in combination with an amine, e.g.:

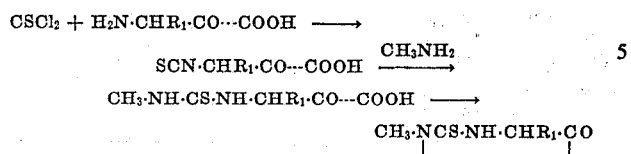

The blocking agent should be coupled to reactive functional groups in the protein molecule so as to avoid that the coupling agent or other reagents used react with these groups in an uncontrollable way. Thus, free carboxylic groups can be esterified by an alcohol as methanol by using HCL, $BF_3$ or $BCL_3$ as a catalyzer or by using diazomethane, $CH_2N_2$. The blocking of $OH-NH_2$, or SH-groups can be carried out by acylation by an acetic acid anhydride, trifluoroacetic acid anhydride, pentafluoropropionic acid anhydride, or heptafluorobutyric acid anhydride. A selective blocking of $NH_2$- groups can be carried out without using the above mentioned alkylisocyanates, or alkylisothiocyanates by using chloroformates. If, however, all the reactive groups in the protein molecule are to be blocked by using the above mentioned blocking agents, it is necessary to carry out a series of successive reactions, i.e., one reaction for each kind of reactive group.

It is, however, possible to block all reactive groups in one single reaction by using certain silicon containing blocking agents. Examples of such a blocking agent are N-O,di(trimethylsilyl)acetamide:

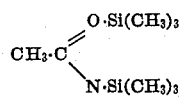

and N-O,di(trimethylsilyl)trifluoroacetamide which has the same formula but in which the hydrogen of the methyl group is substituted by fluorine. Another coupling agent that can be used is hexamethyldisilazane, $(CH3)_3 \cdot Si \cdot NH \cdot Si(CH_3)_3$.

The above-mentioned silicon compounds could also be used for another purpose, namely to increase the volatility of the amino acid derivative split from the protein. If such an increase is performed the amino acid derivative could more easily be removed from the remaining part of the protein by raising the temperature or lowering the pressure or both. Other agents, e.g., trimethylchlorosilane, imethyldichlorosilane, N-trimethylsilyldiethylamine, N-O,di-(dimethylsilyl)acetamide, N-trimethylsilyl-imidazole, might for instance be used for increasing the volatility of the amino acid derivative.

The use of vapor pressure increasing agents also implies that the amino acid derivative will be more resistant to variations in temperature. Thus, the amino acid derivative can be separated from the remaining part of the protein at a higher temperature.

Both these above-mentioned characteristics of the silicon compounds will be illustrated by the following example.

A. A coupling agent consisting of methylisothiocyanate reacts with a protein in which the first two amino acids are treonine and asparaginic acid:

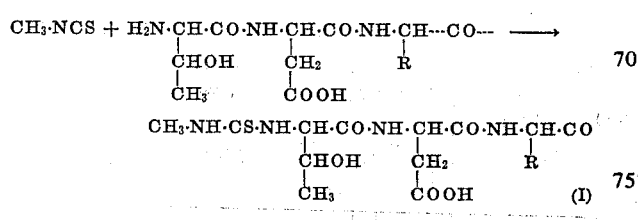

B. The polar groups of the protein derivatives (1) are then made to react with hexamethyldisilazane, thus blocking these polar groups so that no uncontrolled side reactions can appear:

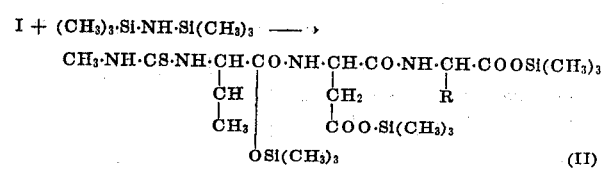

C. The Compound (II) is then split at the first peptide binding by adding trifluoroacetic acid:

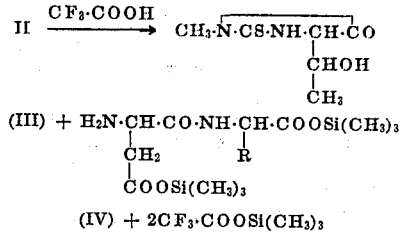

D. In order to increase the volatility of the thiohydantoine (III), a silicon compound is supplied, e.g., N-O,di(trimethylsilyl)acetamide, which reacts with the thiohydantoine (III) as well as with the remaining part of the portion (IV) according to the following formula:

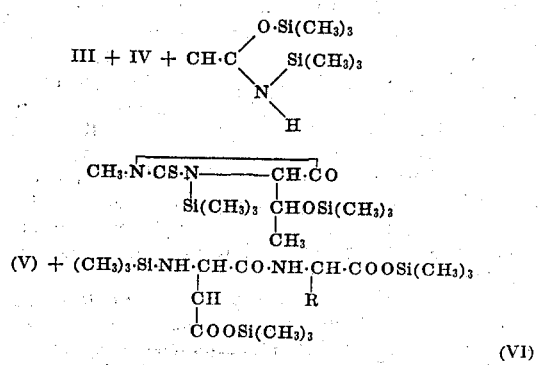

E. The compound V now has a high vapor pressure and can easily be separated from the compound VI by heating or evacuation or both. The vaporized compound V could then be identified by methods known per se.

F. Before the next step of the sequency procedure the trimethylsilyle groups have to be removed from the compound VI, especially and trimethylsilyle group which is bound to the amino end of the compound VI, as otherwise this group would prevent the reaction of the coupling agent. This procedure is carried out by supplying vaporized water, preferably in combination with an alcalic buffer, e.g., trimethylamine. The following hydrolysis then takes place:

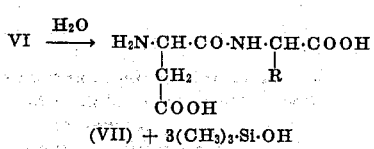

The remaining part of the protein VII is now in such a state that a new series of the steps A–F described above can be carried out.

Figure 2:
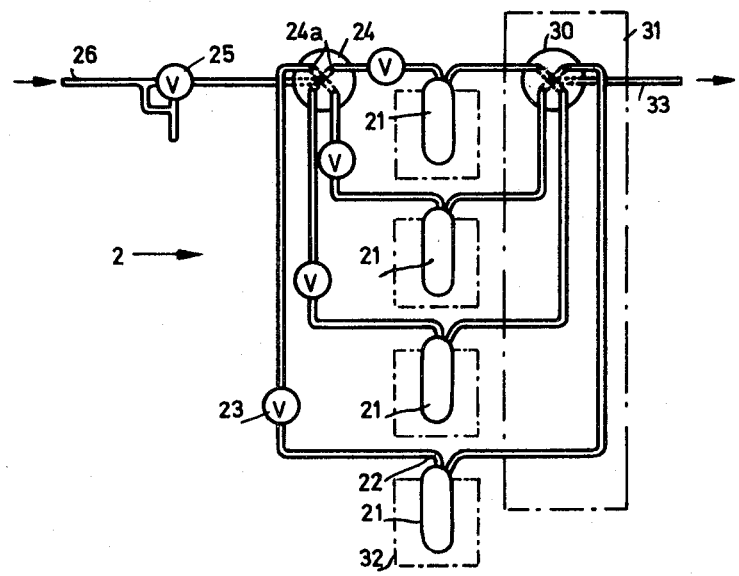

The invention will now be described in detail with reference to the accompanying drawing in which FIG. 1 shows an apparatus according to the invention and FIG. 2 shows a part of the apparatus according to FIG. 1, namely the dosing apparatus in which the mixing of coupling agent and blocking agent with the carrier gas flow is carried out.

The apparatus shown in FIG. 1 mainly comprises a reactor 1 in which the protein reacts, a dosing apparatus 2 in which the reagents used in the precess are mixed with the carrier gas 3, an absorber 3 in which the amino acid derivatives are absorbed and an analyzer 6 in which the amino acids are identified. The analyzer, which might consist of a gas chromatograph or some other apparatus known per se, does not form part of the invention and will thus not be described in detail.

The reactor 1 consists of a vertical tube, comprising a perforated plate 11 on which a granulated solid support 10 is applied. Gas can be supplied via a tube connected to the bottom of the reactor and the gas is drained via a tube connected to the top of the reactor. At a suitable gas velocity the bed is fluidized. The reactor is provided with a sealable opening 13 through which a solution of the protein can be introduced. A second reactor 10a is provided so as to make it possible to transmit the gas through either of the reactors by means of a multiple path valve 12. The gas mixture supplied from the dosing apparatus 2 is transmitted to the reactor via a magnet valve 14 and a relatively narrow tube 15 in which a turbulent flow is obtained so as to obtain a homogeneous gas mixture. The reactor 1, the valves 12 and 14, and the tube 15 are encased in a chamber 16 which can be heated, the heat being controlled by a thermostate by means of which the temperature can be varied between 30°– 100° C.

The dosing apparatus 2 in FIG. 2 comprises a number of containers 21 each of which contains one of the reagents to be used. Each container is surrounded by a chamber 32 and temperature of which is held constant by a thermostat. By choosing a suitable temperature a desired vapor pressure can be obtained. The carrier gas is supplied to the container 21 via a tube 22 which is extended to the bottom of the container. The tube 22 is via a regulating valve 23 connected to a valve unit 24 comprising a magnet valve 24a connected to each container 21. By means of this valve unit the carrier gas can be supplied to one or several containers 21. The carrier gas is supplied to the valve unit 24 from a gas container 27 via a tube 26 which comprises a flow-regulating valve 25 so as to keep the flow at the input of the valve unit 24 constant. Each of the containers 21 are furthermore connected to a valve unit 30, having a design equal to that of the valve unit 24. The valve unit 30 and the tube that connects the unit with the containers 21 are encased in a heat chamber 31 which preferably has a temperature of 100° C. so as to prevent a condensation of the reagent. The gas mixture is supplied to the reactor via a tube 33.

The absorber 3 consists of a tube surrounded by a chamber 34 which can be cooled to −70° C. and heated to about 250° C. The inner wall of the tube is provided with a thin layer of substance in which the amino acid derivatives can be sorbed, the layer consisting of a material which is not vaporized at a temperature of 250° C. The layer might consist of compounds having high molecule weight, e.g., hydrocarbons or silicon compounds. So called silicon oils are also well suited for this purpose. The absorber 3 is connected to the reactor 1 via a valve 35 having a rotatable valve body and 8 inlets and outlets. The valve 35 is furthermore connected to a low-vacuum pump 4, via a tube comprising a three path valve 37 and a cooling trap 38, and a high-vacuum pump 5 via a tube comprising a cooling trap 39. Each valve 35 is furthermore connected to the analyzer 6 and a container 40 containing pure inert gas. The valve 36 is incased in a heat chamber 36 which preferably is kept at a temperature of about 250 C. The valve 35 can be adjusted to two positions. In FIG. 2 the channels 41 of the valve body connect one end of the absorber tube with the reactor 1 and the other end of the absorber tube with the high vacuum pump 5. The valve body can be turned one eighth of a full turn. In the position thus obtained one channel 41 connects the reactor 1 and the three-path-valve 37 while other channels 41 connect the absorber tube 3 with the gas container 40 as well as with the analyzer 6.

The operation of the apparatus will now be described briefly. A solution comprising a protein to be analyzed is introduced into the reactor 1 through the opening 13, and the complete system is flushed with the inert carrier gas. The temperature of the heat chamber 16 is adjusted to about 50° C. The reagents to be used are disposed in the containers 21, i.e., coupling agent, e.g., isothiocyanate, buffer, blocking agent and splitting agent as well as hydrolyzing agent. The temperature of the heat chambers of the containers 21 are then adjusted to temperatures giving desired partial pressures of the respective reagents. By means of the carrier has the reagents are supplied to the reactor 1, in which the protein is disposed, the reactions A–D described above being performed. Between the different reaction steps the reactor is flushed with the inert carrier gas. During the reaction steps the valves 35 and 37 are adjusted so as to make the gas that leaves the reactor 1 pass the apparatus through the three-path-valve 37.

The reactor does now contain the remaining part of the protein which is relatively loosely bound to the solid support. These last-mentioned substances are the amino acid derivatives, remainders of the used reagents and substances formed by undesired side reactions. In order to get rid of the reagents and the side products the three-path-valve 37 is now adjusted so as to connect the reactor 1 to the low vacuum pump 4, the reactor being evacuated to a vacuum of about $10^{-2}$ Torr, the temperature of the reactor simultaneously being raised to 70°–90 C. The volatile reagents and the side reaction substances will then be trapped in the cooling trap 38. After a few minutes the valve 35 is adjusted so as to connect the reactor 1 to the absorber 3 which in turn is connected to the high-vacuum pump. The reactor and the absorber are evacuated so as to obtain a vacuum of at least $10^{-4}$ Torr. The decreasing of the pressure implies that the step E is carried out, i.e., the amino acid derivative leaves the reactor and passes to the absorber. This reaction is facilitated by a weak carrier gas flow which passes through the reactor and the absorber. The amount of gas must not exceed the amount that may pass the system through an opening having a diameter of 0.02–0.04 mm. After a few minutes the valve 35 is switched so as to fill the absorber 3 with inert gas from the gas container 40, the temperature of the chamber 34 simultaneously being raised 250°–300° C. When the absorber has the desired temperature a flow of inert carrier gas is made to pass from the gas container 40 through absorber to the analyzer 6. If the analyzer is a gas chromatograph the complete sample should be introduced within 5–10 seconds. The above-mentioned step F is now carried out and the apparatus is ready for the next step of the sequence analysis.

If the amino acids are identified with a gas chromatograph which works very fast, several reactors can be connected to the same gas chromatograph.

The apparatus according to the invention is preferably controlled automatically. Thus, the valves and the temperatures could be adjusted by a program apparatus known per se. The apparatus could furthermore be used for analyzing amino acids of protein hydrolysates since the reactions in the sequencing procedure are also applicable for free amino acids.

We claim:

1. Method for determining the sequence of the amino acids in a protein by making the protein react with a coupling agent which is coupled to the amino end of the protein molecule, by splitting the obtained protein derivative at the first peptide binding so as to form an amino acid derivative and a remaining part of the protein, and by identifying the amino acid or the amino acid derivative, the determining further comprising subsequent couplings and splittings of the remaining part of the protein and identifications of the amino acid derivatives, characterized in, that the protein is applied to the surface of a solid support, that the coupling agent is supplied in gas phase to the applied protein and that the amino acid derivative split off is removed in gas phase from the remaining part of the protein applied to the solid support.

2. Method according to claim 1, characterized in, that the protein applied to the solid support is treated with a blocking means which blocks reactive groups of the protein molecule, and thus prevents undesired side reactions of the protein and the splitting agent.

3. Method according to claim 1, characterized in, that the protein is adsorbed on the surface of a solid support, consisting of massive granulates without micropores.

4. Method according to claim 1, characterized in, that the coupling agent and the blocking agent supplied to the protein are mixed with an inert carrier gas.

5. Method according to claim 1, characterized in, that the coupling agent consists of a cyanate.

6. Method according to claim 1, characterized in, that the coupling agent consists of an isothiocyanate.

7. Method according to claim 1, characterized in, that the blocking agent consists of a silicon containing compound.

8. Method according to claim 1, characterized in, that after the splitting the adsorbed amino acid derivative is made to react with a vapor pressure increasing agent in order to facilitate the separation of the derivative from the remaining part of the protein.

9. Method according to claim 8, characterized in, that the vapor pressure increasing agent consists of a silicon-containing compound.

10. Method according to claim 9, characterized in, that the silicon containing groups are removed from the remaining part of the protein by a hydrolysis of vaporized water when the volatile amino acid derivative has been removed from the remaining part of the protein adsorbed on the solid support.

11. Method according to claim 3, characterized in, that the amino acid derivative is removed from the remaining part of the protein adsorbed on the solid support by raising the temperature.

12. Method according to claim 3, characterized in, that the amino acid derivative is removed from the remaining part of the protein adsorbed on the solid support by lowering the pressure.

13. Method according to claim 3, characterized in, that the amino acid derivative is removed from the remaining part of the protein adsorbed on the solid support by raising the temperature and lowering the pressure.

14. Method according to claim 1, characterized in, that the removal of the amino acid derivative is preceded by a removal of undesired side products.

15. Method according to claim 1, characterized in, that the amino acid derivative is transferred to a cooled absorber and by heating of the absorber transferred to an analyzer.

16. Apparatus for determining the sequence of the amino acids in a protein characterized in, that the apparatus comprises a reactor, including a solid support on which the protein is adsorbed, means for generating a flow of inert carrier gas, means for supplying this gas through the reactor, means for mixing the gas with a coupling agent in gas phase and for mixing the carrier gas with other reagents in gas phase, e.g., a blocking agent, the apparatus further comprising an absorber in which the volatile amino acid derivatives formed in the reactor are absorbed, means for heating the reactor in order to facilitate a transferring of the amino acid derivative from the reactor to the absorber, an analyzer for identifying the amino acid comprised in the amino acid derivative and, means for heating the absorber so as to facilitate the transferring of the amino acid derivatives from the absorber to the analyzer.

* * * * *